Dec. 7, 1926.  
A. MELDRUM  
1,610,023  
CAST METAL VEHICLE WHEEL  
Filed Feb. 5, 1925    2 Sheets-Sheet 1
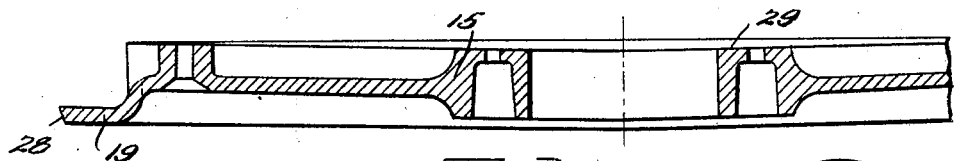
FIG. 3.
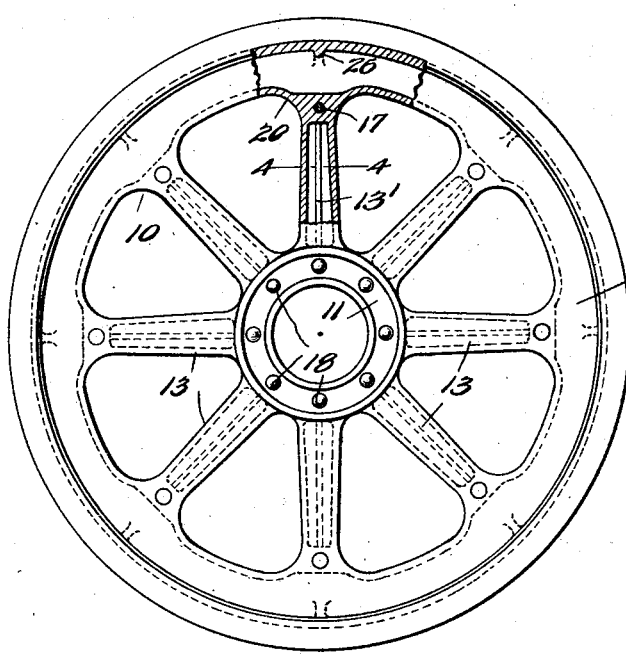
FIG. 1.
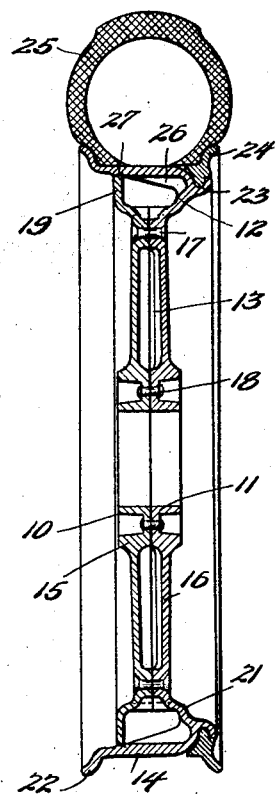
FIG. 2.
FIG. 4.
Witnesses  
David A. Nilsson
Inventor  
Alexander Meldrum  
Watson, Coit, Morse & Grindle  
Attorney Dec. 7, 1926.
A. MELDRUM
1,610,023
CAST METAL VEHICLE WHEEL
Filed Feb. 5, 1925    2 Sheets-Sheet 2
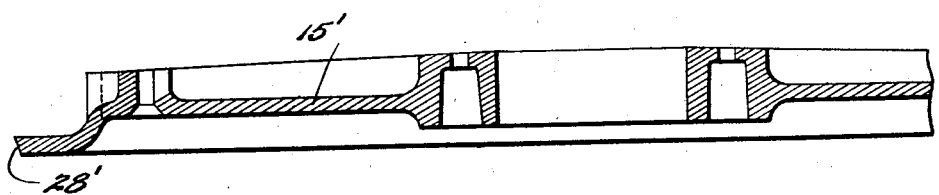
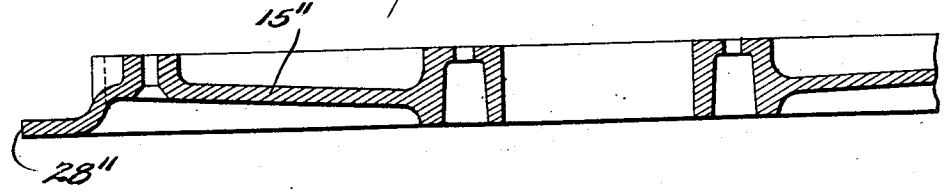
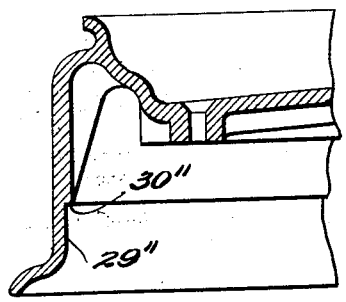
Inventor
Alexander Meldrum,
By Watson, Coit, Morse & Grindle,
Attorney Patented Dec. 7, 1926.

1,610,023

UNITED STATES PATENT OFFICE.

ALEXANDER MELDRUM, OF SYRACUSE, NEW YORK, ASSIGNOR OF ONE-THIRD TO CARL GABRIELSON AND ONE-THIRD TO ADON J. HOFFMAN, BOTH OF SYRACUSE, NEW YORK.

CAST-METAL VEHICLE WHEEL.

Application filed February 5, 1925. Serial No. 7,117.

This invention relates to metal vehicle wheels and more particularly to sectional, cast-metal vehicle wheels.

It is a general object of this invention to provide a novel and improved form of cast, sectional vehicle wheels.

More particularly it is an object of this invention to provide a cast vehicle wheel formed in two sections joined along or near a median plane.

Another object of this invention consists in the provision of metal vehicle wheels formed of two parts joined along or near a median plane, one of which parts has formed integral therewith a rim portion which extends over and is supported by the other section of the wheel.

Other and further objects of the invention will be apparent as the description proceeds.

In the accompanying drawing and following specification there is disclosed, by way of example, only, several modifications of the invention with the understanding, however, that various changes may be made in the form, size, shape, arrangement and material of the various parts by those skilled in the art without departing from the spirit of the invention as expressed in the attached claims.

In said drawings:

Figure 1 is a side elevation of a complete wheel, a portion thereof being broken away to show the construction;

Figure 2 is a diametrical section taken on a plane at right angles to the plane of the wheel;

Figure 3 is a similar section on an enlarged scale through one of the sections of the wheel before joining together;

Figure 4 is a transverse section through the half of a spoke of the rim section of the wheel taken on line 4—4 of Figure 1;

Figure 5 is a view similar to Figure 3, but showing modified form of wheel section;

Figure 6 is a further modification; and

Figure 7 is a radial section through the rim and felloe of a modification as disclosed in Figure 6.

It has been the usual practice in the construction of cast-metal vehicle wheels to follow two general methods in their manufacture. In some instances the wheels are formed as one single casting, in which case it is exceedingly difficult to properly position the cores for the spokes so that they remain exactly central. If there is any slippage, then the walls of the spokes are not of uniform thickness, and a weakened wheel may result. Casting strains are also apt to result, which makes a wheel subject to breakage at a load much below its normal rated load. The expense of making this type of wheel is considerable and the weight is objectionable. The other method consists in forming the wheels of sectors joined together by bolting or riveting along the lines of certain of the spokes. This method results in less difficulty in the actual casting, but requires careful machining to make the wheel truly round when fitted together, and it is exceedingly difficult to produce a wheel which is properly balanced. This method also has the objection of adding considerably to the weight of the wheel.

The present invention contemplates forming the wheel in two sections joined along or near a median plane, and hollow spokes may be provided without the use of cores, the casting operation thus being materially simplified and the possibility of strains almost entirely eliminated. The wheels can be made more accurate, better balanced and cheaper than in the previously mentioned constructions. It has been found that wheels constructed according to this invention are very much stronger than the common form of wood artillery wheel, that they are considerably cheaper to manufacture, and that the weight is about the same. Since they have fewer number of spokes and large fillets where the spokes meet the hub and felloe, they are easier to clean and to paint.

Referring to the drawings, there is disclosed at 10 a two-piece cast metal vehicle wheel having the hub 11, the felloe 12, the spokes 13 and the rim 14. The wheel is composed of two cast sections; a filler section 15 and a rim section 16, of any suitable metal, which are adapted to be secured together by any suitable fastening means such as the rivets 17 near the outer ends of the spokes and the countersunk rivets 18 in the hub portion. The hub portions of the two sections are identical but opposite. The hollow spoke portions are similar but the spoke sections on the rim section are provided with the longitudinal ribs or webs 13' for a purpose to be later described. When the two sections are joined together with the spokes properly registering, there is formed a hub section 11 which may be attached to a vehicle axle in any well-known manner. The hollow cylindrical spokes 13 of any desirable cross section either circular or elliptical, merge into the hub structure. The filler section 15 is offset at its periphery to form the felloe portion 19 as shown in Figs. 2 and 3 which is connected to the spokes by the fillets 20, a solid portion being provided at the end of each spoke section to receive the rivets 17.

The rim section 16 is provided with the offset portion 21 forming a felloe portion and integral therewith is provided the rim 14 which extends laterally of the felloe and beyond the median plane of the wheel so as to meet and extend over the felloe portion 19 on the section 15. This rim 14 may be of any suitable construction to receive a conventional form of tire, and for this purpose the central portion is cylindrical and one edge is provided with the flange 22, whereas the other edge is depressed and provided with the circumferential groove 23 to receive the usual form of locking ring 24 which serves to retain the tire 25 in position on the rim. This particular rim construction is well-known and no claim is made to it. To support the rim from the felloe section 21 webs 26 are cast integral with the felloe and rim opposite each spoke and extend transversely of the wheel. tapering in width from the felloe 21 toward the edge of the rim having the flange 22.

The inner face of the rim 14 is grooved as at 27, this groove having its maximum depth on the inner side and tapering to the inner face of the rim. The edge of the felloe portion 19 is correspondingly shaped as shown at 28 so as to be received within this groove to support the rim.

In manufacture the inner face of the wheel section 16 is machined to a plane while the inner face of the section 15 is dished or concave as shown at 29 in Figure 3. The maximum diameter between the points 28 of this section 15 is such as just to pass within the inner face of the rim 14 on the section 16. The two parts are placed in this position and are pressed together in a suitable press until the section 15 is flattened out, it being sufficiently malleable, and the meeting faces of the two sections closely abut. This causes the section 15 to expand radially so that the edge 28 is projected into the groove 27 and tightly pressed against the bottom of this groove to form a rigid and immovable support for the edge of the rim 14 which is remote from its connection with the felloe 21 of the section 16. The rivets are then put in place and headed over so that the wheel retains its shape. The reinforcing ribs or webs 13', which are best shown in Figure 4, are provided on the rim section in order to stiffen it so that it may not be bent when the concave section is flattened against it. It can readily be seen that if both sections were of the same strength, the resultant wheel would be crowned on a curve somewhat less than the curve of the concave section.

It has been discovered that in assembling the wheel above described, that the expansive action of the spokes, when flattened, does not always sufficiently press the chamfered edge 28 into the channel 27 and, in order to overcome this difficulty, the smaller section of the wheel 15 may be formed convex on its inner side as clearly shown in Figure 5, so that upon assembling, its outer chamfered edge 28' will be pressed into the channel 27' on the inner periphery of the rim, thereby forming an effective fit to more thoroughly support the free edge of the rim section For simplicity and cheapness of construction, it may be desirable to form the section 15 with a plane inner surface as shown in Figure 6 at 15''. It has been found that a wheel equally as satisfactory can be made in this manner at much less cost and, in order that the outer periphery 28'' of the section 15'' may support the rim, there is provided within the inner periphery of the rim the straight cylindrical counterbore 29'' having a stop shoulder 30'' at its inner end. The diameter of the felloe section of part 15'' is made slightly larger than the diameter of this counterbore, so that considerable pressure is necessary to force the two parts together, producing in effect a wheel equally as strong as that described in connection with Figures 1 to 4, inclusive, since the shoulder 30'' transmits the axial thrust of the rim in one direction, to the section 15'' and the pressed fit between the rim and this section takes care of all radial thrust and, to considerable extent, of axial thrust in the opposite direction.

The preferred form of the invention is disclosed in Figures 1 to 4, inclusive, and the most important feature of this form is the interlocking action between the edge 28 and the section 15 and the channel 27 within the rim, due to the radial expanding action of the concave section when flattened to conform to the rim section.

By constructing the wheel as above described, it is possible to secure uniform thickness of the castings without the use of cores. By forming the rim entirely on one portion of the wheel it is solid and hence there is no tendency to separate the two halves of the wheel due to the expanding action of the tire when inflated. The method of dishing or forming the section 15 concave and then compressing it against the flat section causes intimate contact between the parts 28 and 27, resulting in rigid support for the rim under all conditions.

Having thus described the invention, what is claimed as new and desired to be secured by U. S. Letters Patent is:

1. A vehicle wheel including in combination, two cast sections secured together and abutting substantially on a median plane and a rim portion integral with one of said sections and overhanging the other.

2. A vehicle wheel including in combination, two cast metal sections adapted to abut substantially on a median plane and be secured together to form a complete wheel, each section comprising a hub portion, hollow spoke portions and a felloe portion, one of said sections being dished before joining.

3. A vehicle wheel including in combination, two cast metal sections adapted to abut substantially on a median plane and be secured together to form a complete wheel, each section comprising a hub portion, hollow spoke portions and a felloe portion, one of said sections having formed integral with the felloe thereof the complete rim of the wheel adapted to hold a tire.

4. A vehicle wheel including in combination, two cast metal sections adapted to abut along substantially a median plane and be secured together to form a complete wheel, each section comprising a hub portion, hollow spoke portions and a felloe portion, one of said sections having formed integral with the felloe thereof, the complete rim of the wheel adapted to hold a tire, and means on said rim to interlock with the felloe of said other section when the parts are fastened together.

5. A vehicle wheel including in combination, two cast metal sections adapted to abut substantially on a median plane and be secured together to form a complete wheel, each section comprising a hub portion, integral hollow spoke portions and an integral felloe portion, a rim adapted to extend over and be supported by both felloe portions, said rim being integral with one of the said felloe portions.

6. A vehicle wheel including in combination, two cast metal sections adapted to abut along substantially a median plane and be secured together to form a complete wheel, each section comprising a hub portion, integral hollow spoke portions and an integral felloe portion, a rim adapted to extend over and be supported by both felloe portions, said rim being integral with one of said felloe portions, the section not provided with the rim being curved on its facing side before being joined to said other section to expand it into contact with said rim.

7. A vehicle wheel including in combination, two cast metal sections adapted to abut substantially on a median plane and be secured together to form a complete wheel, each portion comprising a hub portion, integral hollow spoke portions and an integral felloe portion, a rim adapted to extend over and be supported by both felloe portions, said rim being integral with one of said felloe portions, the section not provided with the rim being concave on its facing side before being joined to said other section to expand it into contact with said rim, and means on said rim to receive the felloe of said first section and prevent lateral movement thereof in respect to said rim.

8. A cast vehicle wheel formed of two sections oppositely disposed and abutting substantially on a median plane, one of said sections having a curved inner face before joining.

9. A cast metal vehicle wheel formed of two substantially similar sections, oppositely disposed and abutting substantially along a median plane, one of said sections being curved before joining and said other section being reinforced so as to prevent its curving when the sections are pressed together.

In testimony whereof I hereunto affix my signature.

ALEXANDER MELDRUM.